Sept. 6, 1960 R. G. DURNAL 2,951,965

CATHODE RAY IMAGE DISPLAY SYSTEMS

Filed Jan. 23, 1959 2 Sheets-Sheet 1

WITNESSES:

Leon M. Garman

James F. Young

INVENTOR

Robert G. Durnal

BY

Benjamin DeWitt

ATTORNEY

United States Patent Office 2,951,965

Patented Sept. 6, 1960

2,951,965

CATHODE RAY IMAGE DISPLAY SYSTEMS

Robert G. Durnal, Baltimore, Md., assignor to Westinghouse Electric Corporation, East Pittsburgh, Pa., a corporation of Pennsylvania Filed Jan. 23, 1959, Ser. No. 788,597

5 Claims. (Cl. 315—22)

This invention relates to dynamic focusing (variation of focusing field) of cathode ray tubes, and relates more particularly to dynamic focusing circuits for high definition cathode ray tubes such as are used in radar systems.

The need for dynamic focusing of high definition cathode ray tubes has long been realized. In color television receivers, rudimentary dynamic focusing circuits are employed to prevent color smearing at the edges of the pictures. The technique which has been employed is the coupling of a shaped and phase shifted wave in series with the focus potential of an electrostatically focused tube by means of a transformer. This method has sufficed for a television display because of the fixed duty cycle and repetition rate. However, for radar application where the duty cycle, repetition rate and display centering may be radically altered in various modes, the prior dynamic focusing circuits are unsatisfactory.

An object of this invention is to improve dynamic focusing circuits for cathode ray tubes.

Another object of this invention is to provide a dynamic focus signal for a cathode ray tube which is proportional to the increase in path length of the cathode ray beam from the center of deflection of the tube to the center of the screen of the tube.

Another object of this invention is to provide a dynamic focusing circuit for a cathode ray tube, which maintains its accuracy over a wide range of duty cycles, repetition rates and display positioning.

Another object of this invention is to provide dynamic focusing circuits for cathode ray tubes used in radar systems.

The foregoing and other objects of this invention will be apparent from the following description taken in accordance with the accompanying drawing, throughout which like reference characters indicate like parts, which drawing forms a part of this application and in which.

Figure 1:
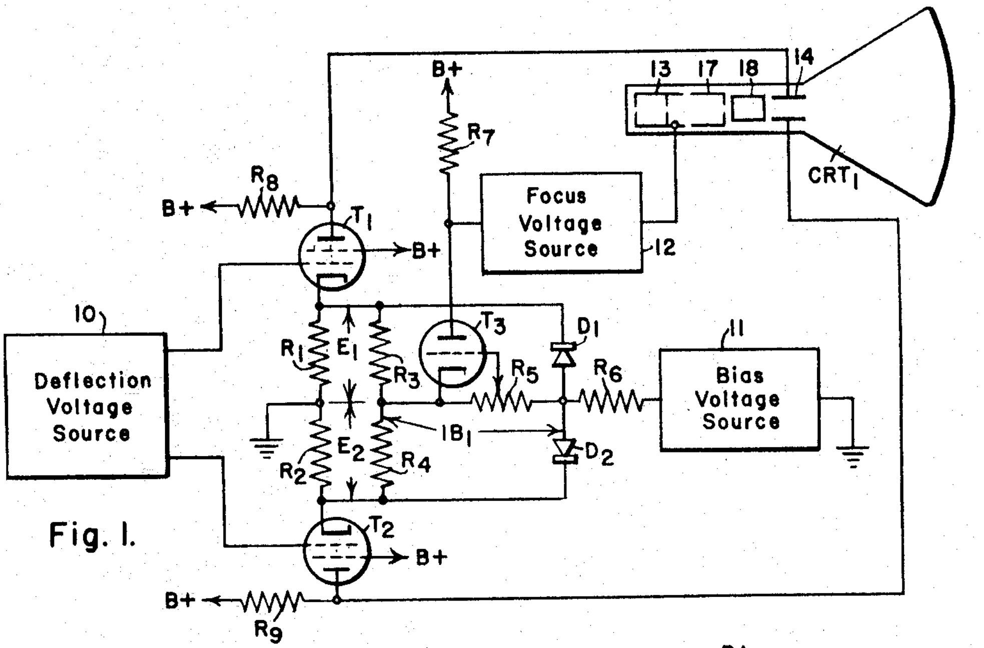
Fig. 1 is a simplified circuit of one embodiment of this invention for a cathode ray tube having electrostatic deflection.
Figure 2:
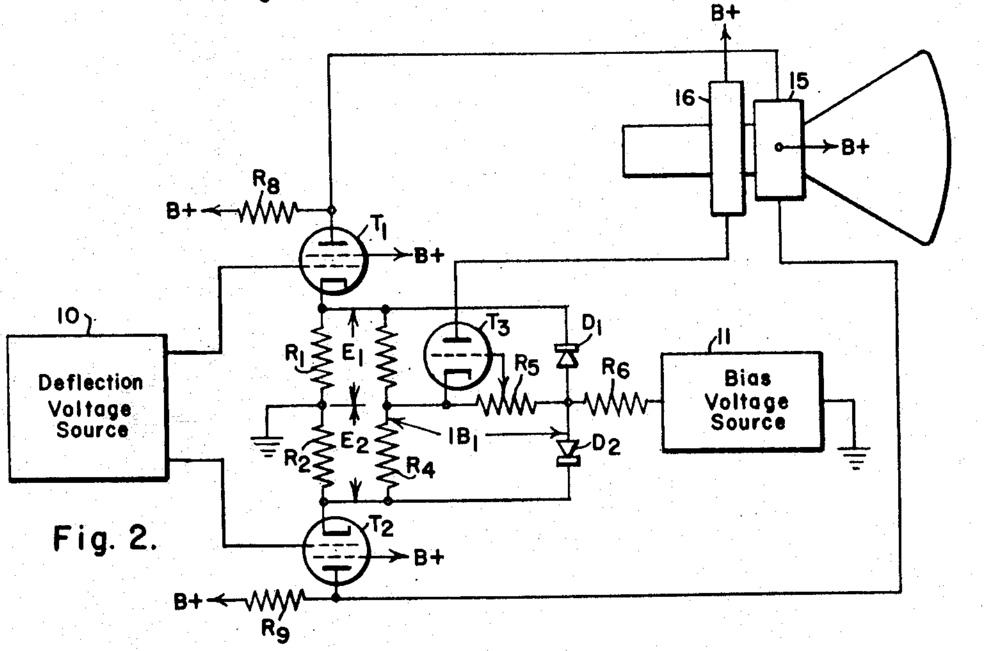
Fig. 2 is a simplified circuit of another embodiment of this invention for a cathode ray tube having electromagnetic deflection.
Figures 3, 4:
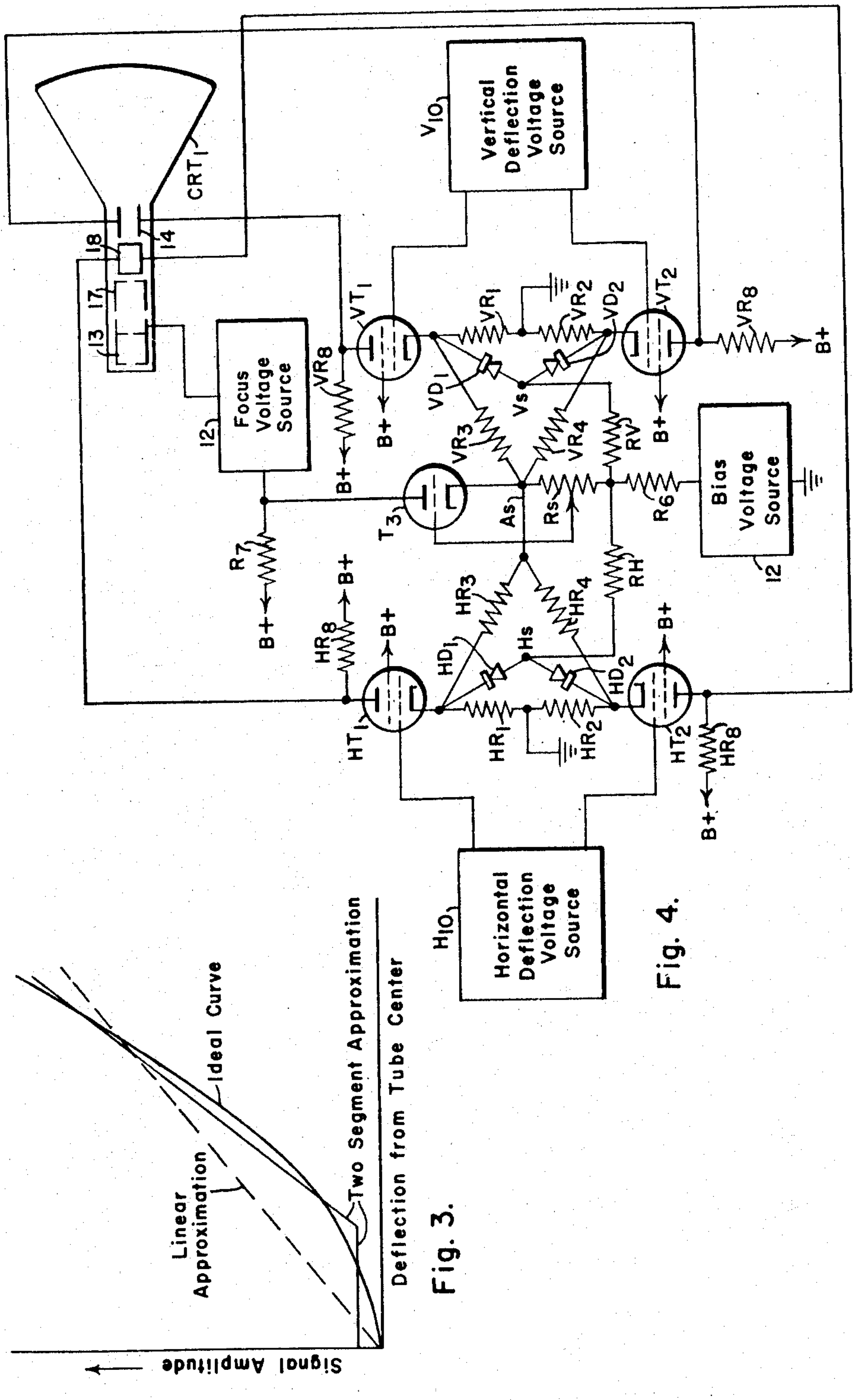
Fig. 3 is a chart showing the relations of the dynamic focusing signals provided by this invention to ideal dynamic focusing signals.
Fig. 4 is a circuit embodying this invention in which horizontal and vertical dynamic focusing signals are combined to provide complete dynamic focusing signals.

For simplicity of explanation, the circuits of Figs. 1 and 2 are for line scan which may be either horizontal or vertical. Fig. 4 shows both horizontal and vertical scan.

Referring first to Fig. 1, push-pull deflection signals from a conventional source 10 are applied to the control grids of the push-pull connected amplifier tubes $T_1$ and $T_2$. The screen grids of the tubes are connected to B+. The plates of the tubes are connected through load resistors $R_8$ and $R_9$ to B+. The cathodes of the tubes are respectively connected to ground through bias resistors $R_1$ and $R_2$. The cathodes of the tubes are also connected through series connected resistors $R_3$ and $R_4$, the junction of which is connected to one end of potentiometer $R_5$, the other end of which is connected to the cathodes of diodes $D_1$ and $D_2$. The anode of the diode $D_1$ is connected to the cathode of the tube $T_1$, and the anode of the diode $D_2$ is connected to the cathode of the tube $T_2$. The junction of the diodes is connected through resistor $R_6$ to the negative terminal of bias voltage source 11, the positive terminal of which is grounded.

The control grid of a dynamic focus amplifier tube $T_3$ is connected to the brush of the potentiometer $R_5$, and its cathode is connected to the end of the potentiometer which is connected to the junction of the resistors $R_3$ and $R_4$. The resistance of the resistor $R_5$ in the grid-cathode circuit of the amplifier tube $T_3$ can be adjusted for providing focus signal amplitude adjustment. The anode of the tube $T_3$ is connected through resistor $R_7$ to B+, and is connected through a conventional focus voltage source 12 to focus electrode 13 (anode No. 2) of a cathode ray tube $CRT_1$. The plates of the tubes $T_1$ and $T_2$ are connected to the vertical deflection plates 14 of the cathode ray tube which has the usual anode No. 2 identified by the reference character 17, and the usual horizontal deflection plates 18.

The resistors $R_1$ and $R_2$ preferably have the same value, and the resistors $R_3$ and $R_4$ have the same value.

In the operation of Fig. 1, at any instant, the voltage $E_1$ across the resistor $R_1$, and the voltage $E_2$ across the resistor $R_2$, are a function of the cathode ray beam or trace position. Let these two voltages be composed of two components A and B such that:

$$E_1=A+B$$
$$E_2=A-B$$

Then A is the combination of steady state potential and common mode signal on the cathodes of the tube $T_1$ and $T_2$, and B is the push-pull signal. The voltage at the junction of the resistors $R_3$ and $R_4$ will be:

$$\frac{E_1+E_2}{2}=A$$

The voltage at the junction of the diodes $D_1$ and $D_2$ will be the lesser of the voltages $A+B(E_1)$ and $A-B(E_2)$ for the polarization shown. The difference in potential between these two junctions is then ±B, depending upon the manner of taking the difference. This signal is proportional to the deflection off center of the trace in the cathode ray tube, and is independent of the direction of deflection. It is applied to the grid-cathode circuit of the focus signal amplifier tube $T_3$, is amplified therein, and then applied to the focus electrode 13 of the cathode ray tube for adjusting its focus.

The dynamic focus signal must be proportional to the increase in path length from the deflection center. This is approximately proportional to the square of the deflection. This square law function can be approximated by a linear function as shown by the dashed line of Fig. 3 if an error of ±17% can be tolerated, and is that which would be provided by the circuit of Fig. 1 if the resistor $R_6$ and the bias source 11 were omitted. By using the resistor $R_6$ and the bias source 11 as shown by Fig 1, a potential is added to the diodes which results in a dynamic focus signal having the two segment approximation of Fig. 3. This reduces the error to ±5.5%.

Fig. 2 is similar to Fig. 1 except that instead of the plates of the deflection amplifier tubes $T_1$ and $T_2$ being connected to deflection plates of an electrostatically deflected cathode ray tube, and the plate of the focus signal amplifier tube $T_3$ being connected to the focus electrode of the electrostatically deflected tube, the plates of the tubes $T_1$ and $T_2$ are connected to opposite ends of a deflection yoke 15 which has a midpoint connected to B+, and the plate of the tube $T_3$ is connected to B+ through an auxiliary focus coil 16 of an electromagnetically deflected tube $CRT_2$. A pentode could be used instead of a triode for the tube $T_3$ for supplying larger current flow through the focus coil, but by proper design of the focus coil, a triode will supply sufficient focus current. Otherwise, the circuit of Fig. 2 is similar to that of Fig. 1, and operates in the same manner.

For deflection in both directions, the beam path length is $L=\sqrt{R^2+(X^2+Y^2)}$ in which R is the distance from the center of deflection of a cathode ray tube to the center of its screen; X is the ordinate and Y is the abscissa. This can be approximated by the first two terms of the binomial expansion as $$L=R+\frac{X^2+Y^2}{2R}$$

or the increase in $$L=\frac{X^2+Y^2}{2R}$$

Thus, the complete dynamic focus signal can be provided by summing the outputs of horizontal and vertical dynamic focus circuits. Fig. 4 shows how this can be done.

In Fig. 4, push-pull connected, horizontal deflection amplifier tubes $HT_1$ and $HT_2$ have their control grids connected to receive horizontal deflection signals from the source H10. Push-pull connected, vertical deflection amplifier tubes $VT_1$ and $VT_2$ have their control grids connected to receive vertical deflection signals from source V10. The cathodes of the tubes $HT_1$ and $HT_2$ are connected by series connected, bias resistors $HR_1$ and $HR_2$, the junction of which is grounded. The cathodes of the tubes $HT_1$ and $HT_2$ are also connected by series connected resistors $HR_3$ and $HR_4$, the junction of which is connected to the cathode of the focus signal amplifier tube $T_3$, and to one end of potentiometer $R_s$. The control grid of the tube $T_3$ is connected to the brush of the potentiometer $R_s$. The other end of the potentiometer $R_s$. is connected through resistor $R_6$ to the negative terminal of bias voltage source 12, the positive terminal of which is grounded. The cathodes of diodes $HD_1$ and $HD_2$ are connected through resistor RH to the negative terminal of the bias source 12. The anodes of the diodes $HD_1$ and $HD_2$ are connected to the cathodes of the tubes $HT_1$ and $HT_2$ respectively.

The cathodes of the vertical deflection amplifier tubes $VT_1$ and $VT_2$ are connected by series connected bias resistors $VR_1$ and $VR_2$, the junction of which is grounded, and are also connected by series connected resistors $VR_3$ and $VR_4$, the junction of which is connected to the cathode of the tube $T_3$. The cathodes of diodes $VD_1$ and $VD_2$ are connected through resistor RV to the negative terminal of the bias source 12, and their anodes are connected to the cathodes of the tubes $VT_1$ and $VT_2$, respectively. The potential between points $H_s$ and $A_s$ on Fig. 4 is the proper horizontal focus correction signal. The potential between points $A_s$ and $V_s$ is the proper vertical focus correction signal. These correction signals are added through resistors RH and RV to obtain the proper correction signal to apply to the grid-cathode circuit of the focus signal amplifier tube $T_3$.

The plates of the tubes $HT_1$ and $HT_2$ are connected through resistors $HR_8$ to B+, and to the horizontal deflection plates 18 of cathode ray tube $CRT_1$. The plates of the tubes $VT_1$ and $VT_2$ are connected through resistors $VR_8$ to B+, and to vertical deflection plates 14 of the tube $CRT_1$. The plate of the tube $T_3$ is connected through resistor $R_7$ to B+, and through focus voltage source 12 to the focus electrode 13 of the tube $CRT_1$.

For an electromagnetically deflected cathode ray tube, the plates of the tubes $HT_1$ and $HT_2$ would be connected to a horizontal deflection yoke, and the plates of the tubes $VT_1$ and $VT_2$ would be connected to a vertical deflection yoke of the electromagnetically deflected tube, and the plate of the tube $T_3$ would be connected to a focus coil of the electromagnetically deflected tube.

While the present invention has been shown in certain preferred forms only, it will be obvious to those skilled in the art that it is not so limited but is susceptible of various changes and modifications without departing from the spirit and scope thereof.

I claim as my invention:

1. A dynamic focus circuit for a cathode ray tube having deflection means and having focus means, comprising a source of deflection voltages; a pair of push-pull connected deflection amplifiers having corresponding control electrodes, output electrodes and electron emitting electrodes; an input circuit including said control electrodes coupled to said source; an output circuit including said output electrodes and said deflection means; means including a first pair of series-connected resistors connecting said emitting electrodes; means connecting the junction of said resistors to said input circuit; means including a second pair of series-connected resistors connecting said emitting electrodes; a pair of diodes having corresponding electrodes connected together, and having their other electrodes connected to said emitting electrodes; means including a fifth resistor connecting the junction of the resistors of said second pair and the junction of said diodes; a focus amplifier having a control electrode, an output electrode, and an electron emitting electrode; an input circuit for said focus amplifier including said control and electron emitting electrodes of said focus amplifier, and said fifth resistor, and an output circuit for said focus amplifier including said output electrode of said focus amplifier and said focus means.

2. A dynamic focus circuit for a cathode ray tube having deflection means and having focus means, comprising a source of deflection voltages; a pair of push-pull connected, deflection amplifiers having corresponding control electrodes, output electrodes and electron emitting electrodes; an input circuit including said control electrodes coupled to said source; an output circuit including said output electrodes and said deflection means; means including a first pair of series-connected resistors connecting said emitting electrodes; means connecting the junction of said resistors to said input circuit; means including a second pair of series-connected resistors connecting asid emitting electrodes; a pair of diodes having corresponding electrodes connected together, and having their other electrodes connected to said emitting electrodes; means including a fifth resistor connecting the junction of said resistors of said second pair and the junction of said diodes; a focus amplifier having a control electrode, an output electrode and an electron emitting electrode; an input circuit for said focus amplifier including said control and electron emitting electrodes of said focus amplifier and said fifth resistor; an output circuit for said focus amplifier including said output electrode of said focus amplifier and said focus means; a bias voltage source, and means connecting the junction of said diodes to said bias voltage source.

3. A dynamic focus circuit for a cathode ray tube having horizontal and vertical deflection means and having focus means, comprising a source of horizontal deflection voltages; a source of vertical deflection voltages; a pair of push-pull connected, horizontal deflection amplifiers having corresponding control electrodes, output electrodes and electron emitting electrodes; an input circuit including said control electrodes coupled to said source of horizontal deflection voltages; an output circuit including said output electrodes and said horizontal deflection means; means including a first pair of series-connected resistors connecting said electron emitting electrodes; means connecting the junction of said resistors to said input circuit; means including a second pair of series-connected resistors connecting said emitting electrodes; a first pair of diodes having corresponding electrodes connected together, and having their other electrodes connected to said emitting electrodes; a pair of push-pull connected, vertical deflection amplifiers having corresponding control electrodes, output electrodes and electron emitting electrodes; an input circuit including said control electrodes of said vertical amplifiers coupled to said vertical deflection voltage source; an output circuit including said output electrodes of said vertical amplifiers and said vertical deflection means; means including a third pair of series-connected resistors connecting said emitting electrodes of said vertical amplifiers; means connecting the junction of said resistors of said third pair to said last mentioned input circuit; means including a fourth pair of series-connected resistors connecting said emitting electrodes of said vertical amplifiers; a second pair of diodes having corresponding electrodes connected together and having their other electrodes connected to said emitting electrodes of said vertical amplifiers; the junctions of said resistors of said second and fourth pairs being connected together; means including a fifth pair of series-connected resistors connecting the junctions of said diodes of said first and second pair; an eleventh resistor connecting the junctions of said resistors of said second and fourth pairs, and the junction of said resistors of said fifth pair; a focus amplifier having a control electrode, an output electrode and an electron emitting electrode; an input circuit including said control and electron emitting electrodes of said focus amplifier and said eleventh resistor, and an output circuit including said output electrode of said focus amplifier and said focus means.

4. A dynamic focus circuit for a cathode ray tube having horizontal and vertical deflection means and having focus means, comprising a source of horizontal deflection voltages; a source of vertical deflection voltages; a pair of push-pull connected, horizontal deflection amplifiers having corresponding control electrodes, output electrodes and electron emitting electrodes; an input circuit including said control electrodes coupled to said source of horizontal deflection voltages; an output circuit including said output electrodes and said horizontal deflection means; means including a first pair of series-connected resistors connecting said emitting electrodes, means connecting the junction of said resistors to said input circuit; means including a second pair of series-connected resistors connecting said emitting electrodes; a first pair of diodes having corresponding electrodes connected together and having their other electrodes connected to said emitting electrodes; a pair of push-pull connected vertical deflection amplifiers having corresponding control, output and electron emitting electrodes; an input circuit including said control electrodes of said vertical deflection amplifiers coupled to said source of vertical deflection voltages; a third pair of series-connected resistors connecting said emitting electrodes of said vertical amplifiers; means connecting the junction of said resistors of said third pair to said last mentioned input circuit; a fourth pair of series-connected resistors connecting said emitting electrodes of said vertical amplifiers; a second pair of diodes having corresponding electrodes connected together and having their other electrodes connected to said emitting electrodes of said vertical amplifiers; the junctions of said resistors of said second and fourth pairs being connected together; means including a fifth pair of series-connected resistors connecting the junctions of said diodes of said first and second pairs; an eleventh resistor connecting said junctions of said resistors of said second and fourth pairs and the junction of said resistors of said fifth pair; a focus amplifier having a control electrode, an output electrode and an electron emitting electrode; an input circuit including said control and emitting electrodes of said focus amplifier and said eleventh resistor; an output circuit including said output electrode of said focus amplifier and said focus means; a source of bias voltage, and means connecting said bias source to the junction of said fifth resistors.

5. In combination with a cathode ray tube having deflection means and focusing means, a pair of push-pull connected amplifier devices having corresponding control electrodes, output electrodes and electron emitting electrodes; means coupling said output electrodes and said deflection means for dynamically positioning said cathode ray in accordance with the difference between the output currents of said amplifier devices; input means for applying signals corresponding to desired deflection of said cathode ray to said control electrodes; means coupled to said electron emitting electrodes for producing a focus control signal varying as a function of the absolute value of the difference between said output currents, and means coupled to said focusing means and responsive to said control signal for variably energizing said focusing means to vary the focal length of said cathode ray in accordance with lateral deflection thereof.

References Cited in the file of this patent

UNITED STATES PATENTS

| | | |
|---|---|---|
| 2,543,434 | Bryan | Feb. 27, 1951 |
| 2,700,741 | Brown | Jan. 25, 1955 |
| 2,740,069 | Minto | Mar. 27, 1956 |
| 2,860,284 | McKim | Nov. 11, 1958 |